June 18, 1935.  D. R. BACON ET AL  2,004,971
TURNSTILE
Filed Aug. 6, 1930   5 Sheets-Sheet 1

June 18, 1935. D. R. BACON ET AL 2,004,971
TURNSTILE
Filed Aug. 6, 1930 5 Sheets-Sheet 3

Daniel R. Bacon
Leon H. Downs
INVENTORS

BY
ATTORNEY

June 18, 1935.　　　D. R. BACON ET AL　　　2,004,971
TURNSTILE
Filed Aug. 6, 1930　　　5 Sheets-Sheet 4
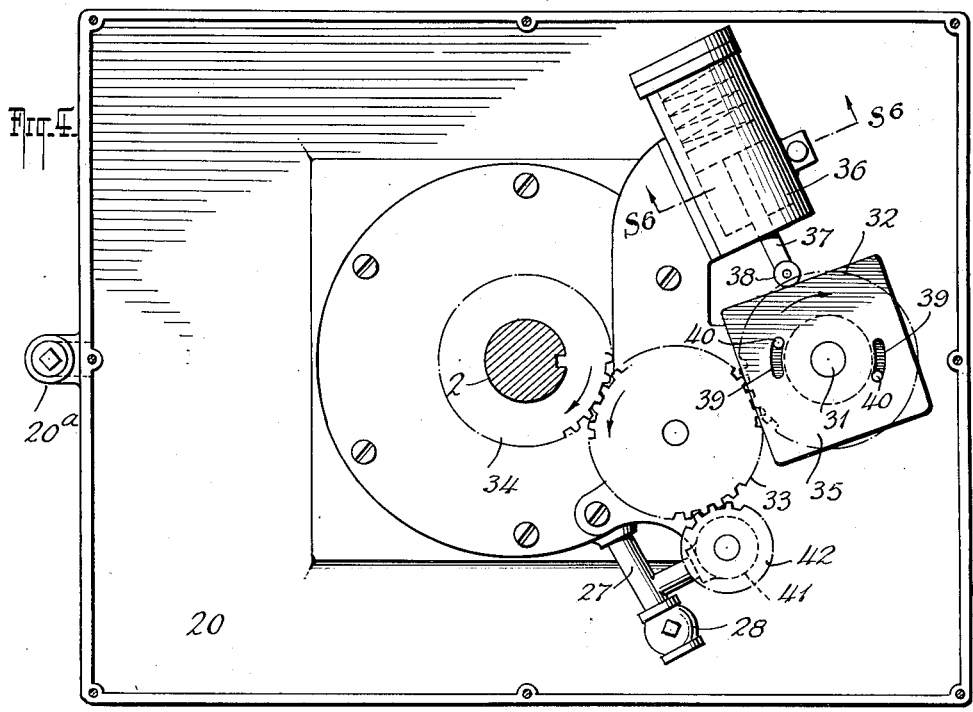
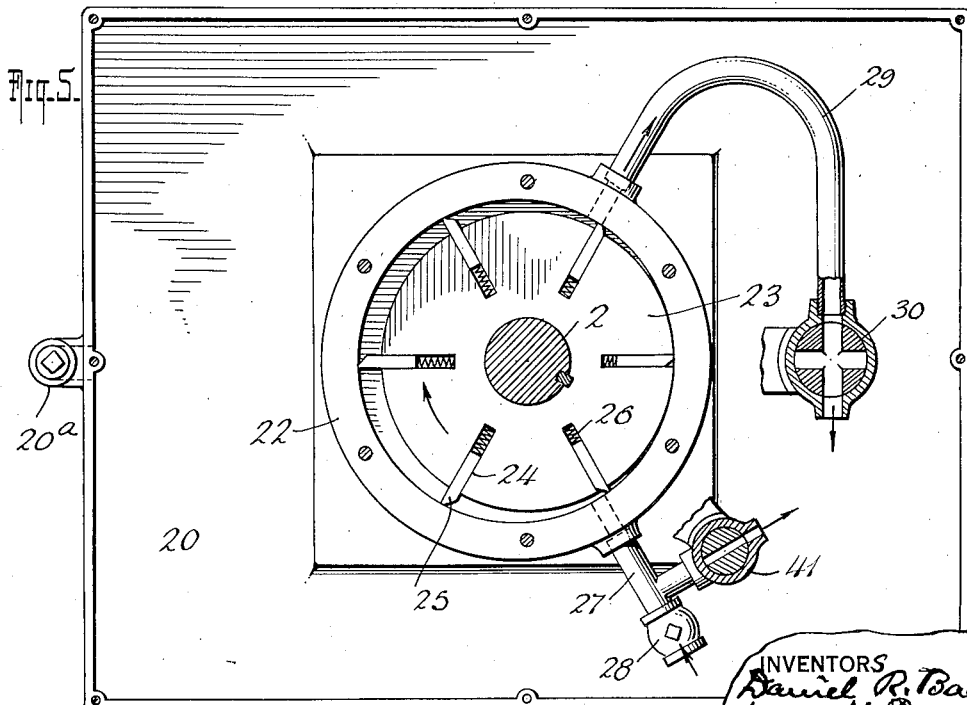

June 18, 1935.  D. R. BACON ET AL  2,004,971
TURNSTILE
Filed Aug. 6, 1930   5 Sheets-Sheet 5
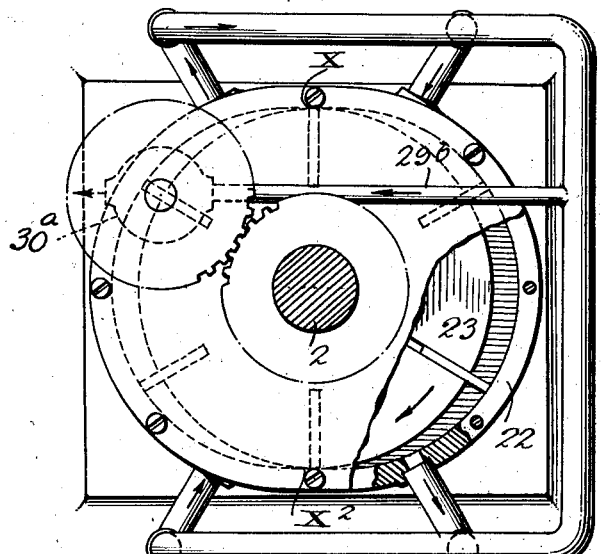
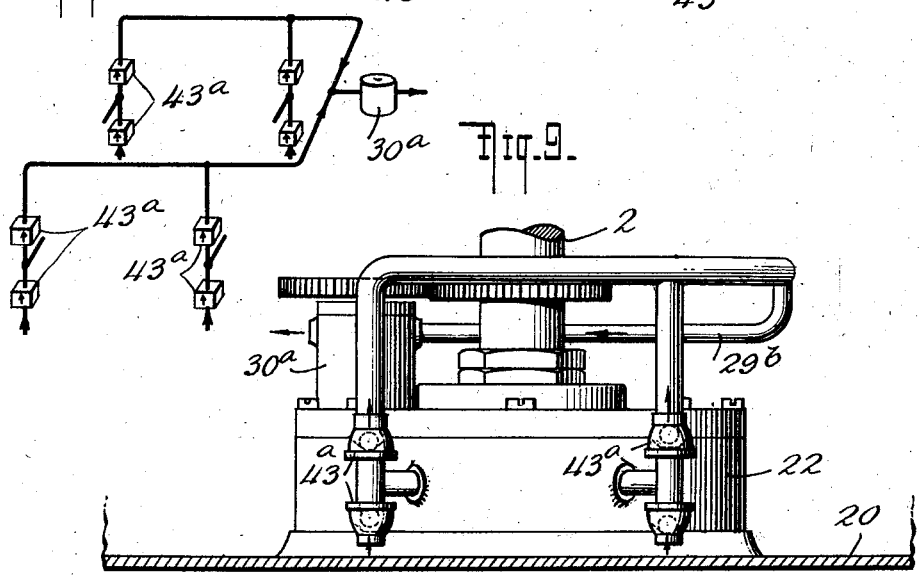

Patented June 18, 1935

2,004,971

UNITED STATES PATENT OFFICE 2,004,971

TURNSTILE

Daniel R. Bacon and Leon H. Downs, Goshen, N. Y., assignors to Perey Manufacturing Company, Inc., New York, N. Y., a corporation of New York Application August 6, 1930, Serial No. 473,382

11 Claims. (Cl. 39—3)

Our invention relates generally to turnstiles and more particularly to means for rendering the turnstile mechanism noiseless, without reducing its effectiveness in operation.

Owing to the rough treatment turnstiles are ordinarily subjected to, it has been the general practice to construct the mechanism of extra heavy durable parts, particularly the locking pawls, stop pawls, ratchets, etc., employed, which are actuated by strong springs and in consequence, are objectionably noisy in operation. The familiar loud, sharp clashes, as these heavy metal parts come violently into contact, are especially disturbing in busy railroad and subway stations, ferry houses and like locations, where turnstiles are employed in gangs of ten or more, and, in the rush hours, are practically in continuous operation.

The demand of the travelling public for the elimination of this nerve-racking nuisance has become so insistent that transportation companies are now seriously considering the problem of producing a noiseless turnstile and the present invention, as herein embodied, is designed to present a practical solution of the problem.

In carrying the invention into effect, the heavy spring-actuated locking and stop pawls, ratchets, etc., of the present day turnstile, are dispensed with and the only positive check, employed as a matter of preference, for limiting rotation of the turnstile, is a light stop pawl, which is practically noiseless in operation and, in certain types of turnstiles, forms part of and/or is operated by the coin mechanism by which the turnstile is controlled; in other types, it may be manually operated but, if preferred, it may be dispensed with and some other device substituted.

As a check on the speed of rotation of the turnstile and to slow down its motion as it approaches the end of each operation, we employ a brake, preferably, though not necessarily, of the hydraulic type, which is connected to be operated automatically by the turnstile. This brake may be of any form or construction desired, but, as herein embodied, consists of a liquid circulating system, a pump operated by the turnstile for imparting movement to the liquid and an automatic valve, or other means, operating to interrupt the flow of the liquid and thereby create back pressure on the pump for a limited period during each operation of the turnstile.

In its preferred operation, the brake is gradually applied and does not exert its full force until the turnstile has about completed each quarter-turn.

In thus checking the speed of rotation of the turnstile at this point, violent contact and the resulting clash of metal is avoided, as the stop-pawl comes into play. While the stop pawl is designed to permit limited play, it acts as a positive check on extended rotary movement of the stile, until the pawl is again released by the insertion of another coin, or manually by an attendant or otherwise, depending upon the type of turnstile employed. Immediately following the full application of the brake, and as the stop pawl comes into action, the brake is suddenly released, leaving the stile under the control of the stop-pawl only, ready for the next operation. Constructed as described, the turnstile is completely silenced, operating without audible sound.

In the accompanying drawings, we have illustrated a preferred construction and several modifications embodying our invention, but do not wish to be understood as intending to limit ourselves to the same, as various changes may be made therein without departing from the spirit and scope of the invention, as set forth in the appended claims.

In the drawings:

Fig. 4 is a horizontal sectional view, taken on the line $s^4$, $s^4$, of Fig. 3;

Fig. 5 is a similar view taken on the line $s^5$, $s^5$, of Fig. 3;

Fig. 7 is a plan view, illustrating a modification of the construction shown in Fig. 5;

Fig. 8 is a similar view of a further modification;

Fig. 9 is a side elevation thereof, and

Fig. 10 is a diagrammatic view of the inlet and outlet connections employed in Figs. 8 and 9.

Figure 1:
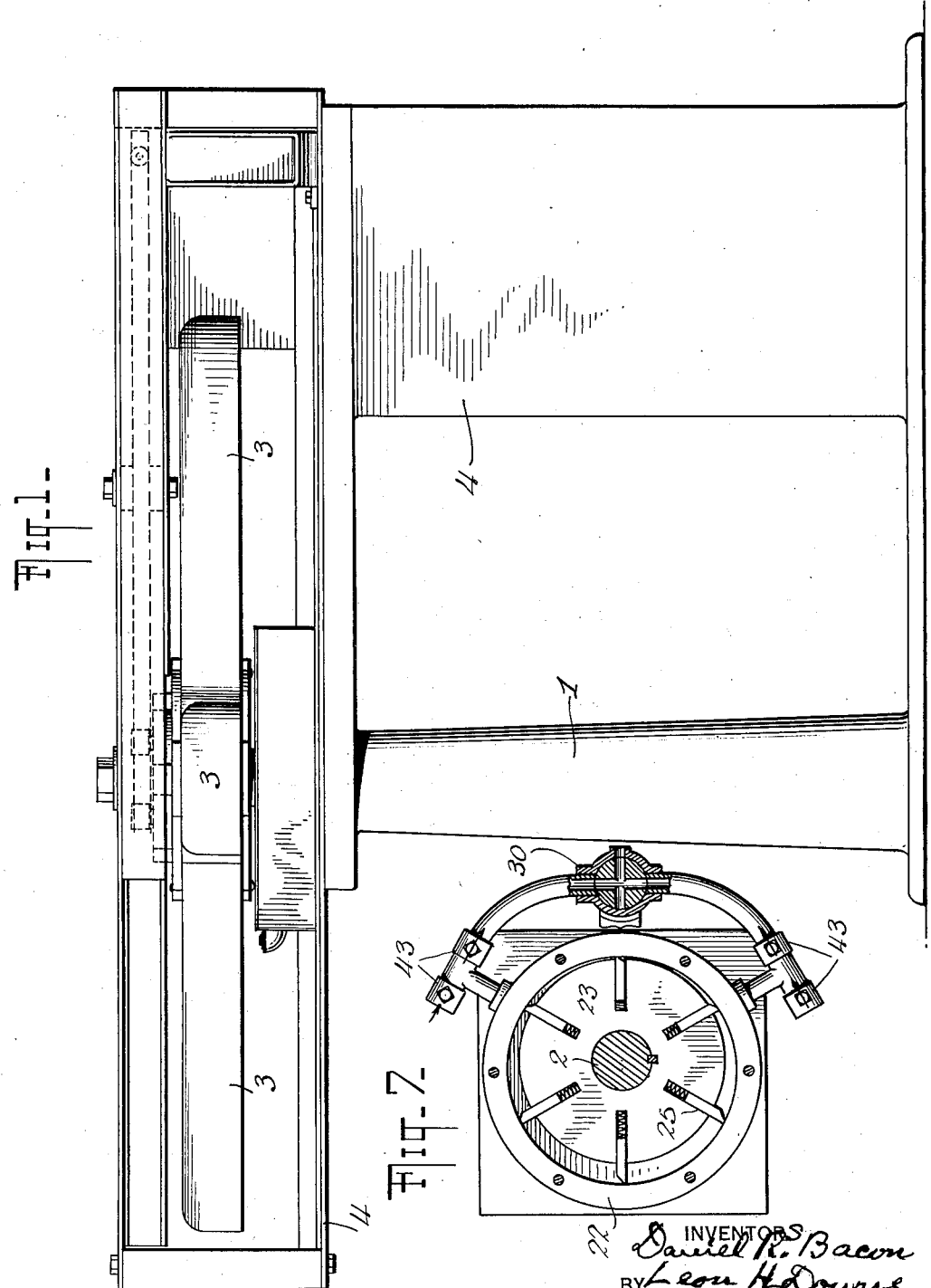
Fig. 1 is a view in elevation of a well-known type of turnstile, selected for the purposes of illustration only, to which our invention is shown applied.
Figure 2:
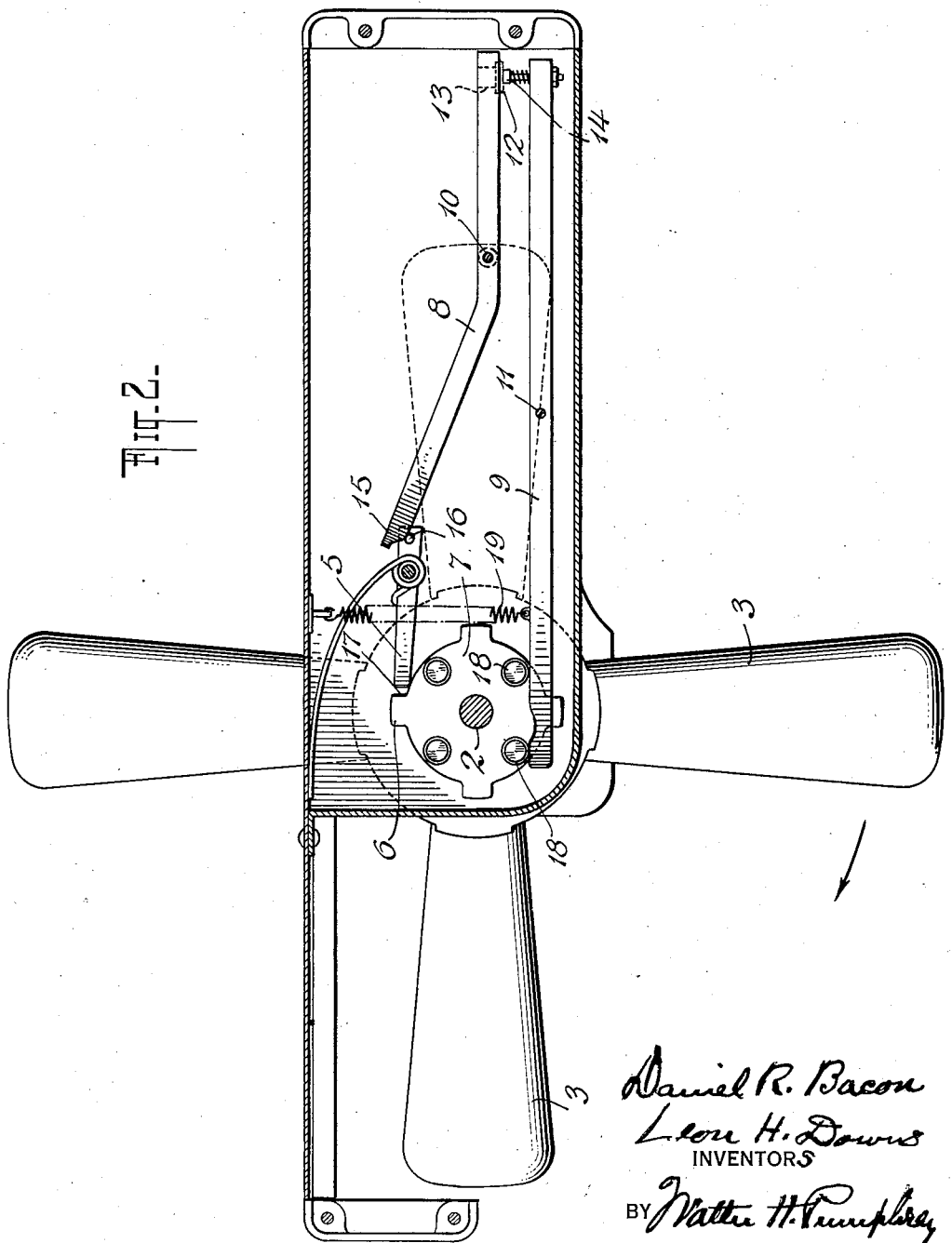
Fig. 2 is a top plan view thereof, with parts of the casing broken away to show the enclosed coin-operated mechanism.

Referring now to the drawings, 1 represents the supporting standard or pedestal of the turnstile, 2 is the turnstile shaft, carrying fast thereon four equispaced arms 3, and 4, in a suitable enclosing casing, cut away to permit rotation of the arms.

Within the casing of the turnstile here shown, a coin-operated mechanism is arranged to control the release of a spring retracted locking or stop pawl 5. This pawl, suitably mounted, is designed to successively engage four equi-spaced lugs 6, of a disk 7, fast on the turnstile shaft 2, and while permitting free rotation of the turnstile for exit, acts to limit rotation, in the direction to admit passengers or patrons, to substantially a quarter revolution for each coin inserted.

While the coin mechanism employed may be of any form desired, that shown comprises two levers 8 and 9, pivoted, respectively, at 10 and 11, and shaped and positioned to provide a coin pocket 12, between their adjacent ends. The lever 8 is apertured at 13, in line with the coin pocket and the lever 9 carries a spring pin or coin finder 14, centered relatively to the aperture. When the lever 9 is given movement about its pivot by means hereinafter described, it will impart like movement to the lever 8, provided there is a coin in the coin pocket 12, otherwise the pin 14 will pass idly into and out of the aperture 13, without actuating the lever 8.

Assuming a coin present, the shaped end 15 of the lever 8, engaging a pin or stud 16, of the pawl 5, will trip the pawl, swinging it clear of the lug 6, and releasing the turnstile for operation. In this type of coin-mechanism, which is entirely mechanical, as distinguished from other types in which the inserted coin is utilized to directly or indirectly close an electric power circuit, it is necessary that the turnstile be free for limited forward rotation by the incoming passenger, in order to impart the required initial movement to actuate the coin finder carried by the lever 9. This is provided for by normally spacing the engaging end of the locking pawl 5, and the lug 6, in separated relation, as indicated at 17, so that the turnstile arm extending across the entrance passage may be advanced four or five inches before the locking pawl becomes effective. This free rotation of the turnstile serves, through the action of four equi-spaced rollers 18, on the disk 7, to successively engage and rock the lever 9, sufficiently to actuate the coin finder, as a preliminary step in each operation of the turnstile. Two of these rollers 18 normally engage the end of the lever 9, at separated points and through the action of a heavy spring 19, the lever 9 is caused to yieldingly maintain the turnstile arms properly positioned.

Figure 3:
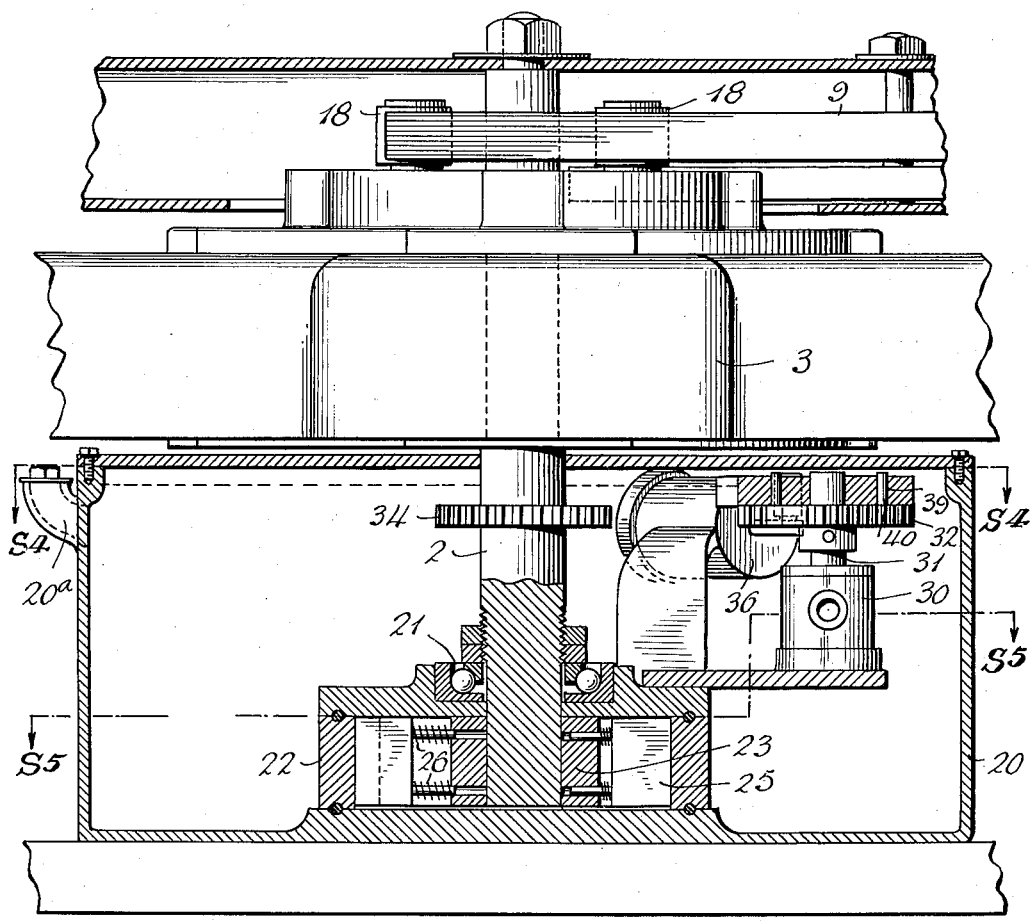
Fig. 3 is a fragmentary vertical sectional view taken on the line of the main shaft of the turnstile.
Figure 6:
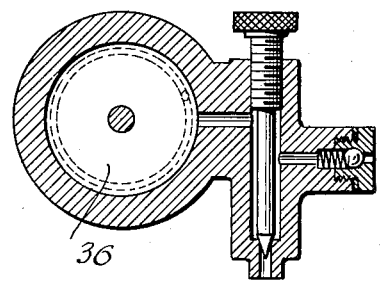
Fig. 6 is a detail sectional view on the line $s^6$, $s^6$, of Fig. 4.

To reduce and check the speed of rotation of the turnstile, particularly near the end of each quarter revolution, we employ a suitable brake, preferably of the hydraulic type shown in Figs. 3, 4 and 5.

As herein embodied, the brake comprises a reservoir or tank 20, for oil or any other suitable liquid, which is entered through a connection 20ᵃ. The reservoir or tank is preferably located just below the turnstile arms and encloses the lower end portion of the turnstile shaft, the main bearing 21, of which is within the oil reservoir.

Also within the reservoir and located immediately below the main bearing of the turnstile shaft, there is a rotary pump. This pump consists of a circular stationary casing or cylinder 22, and a rotary piston 23, mounted fast on the end of the turnstile shaft, in concentric relation thereto but eccentric to the bore of the casing or cylinder 22, as is best shown in Fig. 5.

The rotary piston is radially slotted at 24 to provide guide ways for a suitable number of spring-advanced slide-valves or vanes 25, which, under the action of their springs 26, are continuously forced outward and maintained in sliding contact relation with the wall of the cylindrical pump casing.

An inlet connection from the reservoir or tank to the pump cylinder is provided at 27, and within the connection there is a check valve 28. An outlet connection from the pump cylinder to the reservoir is indicated at 29, and controlling this outlet, there is a four-way rotary valve 30, the stem 31 of which is connected through gears 32, 33 and 34 to be rotated from and at the same speed as the turnstile shaft. The gear 32 is loose on the valve stem 31, the gear 33 is an intermediate idler and the gear 34 is fast on the turnstile shaft.

Normally or when the turnstile is not in operation, the outlet valve is full open, as shown in Fig. 5. After the turnstile is started into operation, and completes the first half of its movement, further rotation of its shaft, through the above gearing and other mechanism to be described, will give motion to the stem of the outlet valve, gradually restricting the outlet as the turnstile nears the full quarter revolution, when the valve comes to a full closing, thereby creating back pressure on the pump and checking the speed of rotation of the stile. At this point in the operation, it is necessary to effect a full, quick opening of the outlet valve and this is accomplished by means of a square cam 35, fast on the stem of the outlet valve and a co-operating dash-pot 36, the spring-advanced piston 37 of which is provided with a terminal roller 38, in riding contact with the cam. Formed in the cam at diametrically opposite points, there are two arc-shaped slots 39, in which pins or studs 40 from the gear 35, project. Normally or when the turnstile is not in operation, the pins or studs 40 are positioned in the slots 39, at the opposite ends from that shown in Fig. 4, so that motion will not be transmitted by the gear pins to the cam until the turnstile completes the first half of its operation. When such transmission is effected it continues until the rotation of the cam, in the direction indicated by the arrow in Fig. 4, brings its slightly rounded corner in line with the terminal roller of the dash-pot piston, at which point the outlet valve 30, of the pump is fully closed and the turnstile has nearly completed its operation.

As the point of the cam passes the center of the roller, the spring of the dash pot, then under full compression, drives its piston outward, forcing the cam to the extent permitted by the pins and slots, ahead of the gear, to a position of full opening of the outlet valve, and the pump being thus freed of back pressure, the full quarter revolution of the turnstile is completed by either or both the person passing through or/and the action of the lever 9, and rollers 18, under the pull of the heavy spring 19.

In this final movement, the turnstile rotates somewhat beyond the full quarter revolution or to the point where the lug 6, meets the engaging end of the stop pawl 5, and in order to permit the turnstile to reverse and be brought back to proper position by the action of the spring-actuated lever 9, and rollers 18, a bleeder valve 41, is provided in the inlet connection 27.

The bleeder valve is connected through a pinion 42, meshing with the gear 33, to come to full opening at the point above described and acts temporarily, as a restricted outlet from the pump cylinder, at which time the normal pump outlet 30, becomes temporarily the inlet, the arrangement being such that the necessary limited reversal of rotation of the turnstile is permitted.

As it is at times or in certain locations desirable to have the turnstile rotate in both directions, to permit entrance of passengers, as above described, and to provide free exit, the brake may be readily made effective for action in both directions by slightly modifying the connections as shown in Fig. 7.

In this modification, there are two sets of duplicated connections, either one of which may serve to provide inlet from the tank or reservoir to the pump cylinder, while the other set provides outlet from the cylinder, through the four-way outlet valve, to the tank depending upon the direction of rotation of the turnstile.

Check valves are employed in the connections, at points indicated by the small rectangles 43, and the direction of opening of such valves is indicated by arrows. In such a construction, the four-way outlet valve 30 is geared, as previously described, to be driven from the turnstile shaft but here there would be no occasion for employing the bleeder-valve 41, and the same is accordingly omitted.

The modification illustrated in Figs. 8, 9 and 10, is practically a duplex form of the pump last above described. By maintaining closure between the pump cylinder and the rotary piston at points X and X²m and doubling the inlet connections 27ª, and the outlet connections 30ª, a complete pump is formed on each side of a line joining X—X². The outlet connections are united as indicated at 29ᵇ, and terminate in a four-way valve 30ª, which is geared as previously described to be operated from the turnstile shaft.

Check valves employed in this modification, are indicated by small rectangles 43ª, and the direction of opening of such valves is shown by arrows in the rectangles.

In this modification, as in the modification shown in Fig. 7, the turnstile is designed to rotate in either direction under the action of the brake and as the connections are duplicated, the direction of flow of the liquid will be determined by the direction of rotation of the turnstile.

As the operation and important advantages of the invention will be apparent from the foregoing description, it will not be necessary to further enlarge upon the same.

It will be understood that the particular hydraulic brake structure shown and described is employed mainly for the purpose of completing an operative illustration and not with the intention of limiting the invention to the same, as many other forms of hydraulic brakes are available which may be substituted, if preferred.

Having thus described our invention, what we claim is:

1. The combination of a turnstile, a liquid circulating system including a container for the liquid, a pump operated by the turnstile for imparting movement to the liquid, and means for automatically creating back pressure on the pump for a predetermined period of time to check the movement of the turnstile during each operation thereof.

2. The combination of a turnstile, a body of liquid and a suitable container for the liquid, a pump operated by the turnstile for imparting a circular movement to the liquid, and means for automatically checking the flow of the liquid for a period of time during each operation of the turnstile to retard its movement.

3. The combination of a turnstile, a confined body of liquid and a suitable container for the liquid, a pump operated by the turnstile for imparting movement to the liquid, and means for creating back pressure on the pump by automatically varying the pump outlet for a predetermined period of time during each operation of the turnstile to retard the movement of the turnstile.

4. The combination of a turnstile, a confined body of liquid and a suitable container for the liquid, a pump operated by the turnstile for imparting movement to the liquid, and an automatic valve operating to interrupt the flow of the liquid for a limited period of time during each operation of the turnstile to retard the movement of the turnstile.

5. The combination of a turnstile provided with a rotatable shaft having passage-barring arms fast thereon, a liquid circulating system including a suitable container for the liquid, a rotary pump for imparting motion to the liquid, the rotor of the pump being driven from the turnstile shaft, and means for creating back pressure on the pump for a predetermined period of time during each operation of the turnstile to retard the movement of the turnstile.

6. The combination of a turnstile provided with a rotatable shaft having passage-barring arms fast thereon, a circulating body of liquid and a suitable container for the liquid, a rotary pump for imparting motion to the liquid, the rotor of the pump being mounted fast on and driven by the turnstile shaft and means for automatically checking the flow of the liquid for a predetermined period of time during each operation of the turnstile to retard the movement of the turnstile.

7. The combination of a turnstile provided with a rotatable shaft having passage-barring arms fast thereon, a circulating body of liquid and a suitable container for the liquid, a rotary pump for imparting motion to the liquid, the rotor of the pump being mounted fast on and driven by the turnstile shaft, and an automatic valve for interrupting the flow of the liquid to create back-pressure on the pump for a predetermined period of time during each operation of the turnstile to retard the movement of the turnstile.

8. The combination of a turnstile provided with a rotatable shaft having passage-barring arms fast thereon, a circulating body of liquid and a suitable container for the liquid, a rotary pump for imparting motion to the liquid, the rotor of the pump being mounted fast on and driven by the turnstile shaft, and a valve actuated by the turnstile on each operation thereof to interrupt the flow of the liquid for a predetermined period of time to retard the movement of the turnstile.

9. In a coin controlled turnstile, a braking structure comprising a circulating body of liquid and a suitable container for the liquid, a pump operated by the turnstile for giving movement to the liquid, and means for automatically checking the flow of the liquid for a limited time during each operation of the turnstile to retard the movement of the turnstile.

10. In a coin controlled turnstile, a braking structure comprising a circulating body of liquid and a suitable container for the liquid, a pump operated by the turnstile for giving movement to the liquid, and means for automatically interrupting the flow of the liquid to check rotation of the turnstile at a predetermined point in each operation thereof.

11. The combination of a turnstile and a breaking structure comprising a circulating body of liquid, a pump operated by the turnstile for imparting movement to the liquid, and an outlet from the pump proportioned and arranged to limit the flow of the liquid as required to create requisite back pressure on the pump to check the rotation of the turnstile for a predetermined interval during each operation of the turnstile.

DANIEL R. BACON.
LEON H. DOWNS.